(12) United States Patent
Mohanty

(10) Patent No.: US 11,275,050 B2
(45) Date of Patent: Mar. 15, 2022

(54) SEMICONDUCTOR-BASED BIOSENSOR AND DETECTION METHODS

(71) Applicant: FemtoDx, Inc., Beverly Hills, CA (US)

(72) Inventor: Pritiraj Mohanty, Beverly Hills, CA (US)

(73) Assignee: FemtoDx, Inc., Beverly Hills, CA (US)

( * ) Notice: Subject to any disclaimer, the term of this patent is extended or adjusted under 35 U.S.C. 154(b) by 0 days.

(21) Appl. No.: 16/211,153

(22) Filed: Dec. 5, 2018

(65) Prior Publication Data

US 2020/0088675 A1 Mar. 19, 2020

Related U.S. Application Data

(60) Provisional application No. 62/594,721, filed on Dec. 5, 2017.

(51) Int. Cl.
| | |
|---|---|
| *G01N 27/414* | (2006.01) |
| *G01N 27/327* | (2006.01) |
| *G01N 27/12* | (2006.01) |
| *B82Y 15/00* | (2011.01) |

(52) U.S. Cl.
CPC .......... *G01N 27/4145* (2013.01); *B82Y 15/00* (2013.01); *G01N 27/12* (2013.01); *G01N 27/3278* (2013.01); *G01N 27/4146* (2013.01)

(58) Field of Classification Search
CPC ............. H03H 9/02244; H03H 9/2463; H03H 2009/02496; H03H 2009/241; H03H 3/007; H03H 9/02007; H03H 9/02535; H03H 9/2405; H03H 9/02259; H03H 9/02338; H03H 9/2431; H03H 9/02275; H03H 9/485; H03H 2009/02354; H03H 2009/02464; H03H 9/02417; H03H 9/2447; H03H 9/505; H03H 2009/02299; H03H 2009/02511; H03H 9/46; H03H 9/525; H03H 2009/02314; H03H 2009/0244; H03H 2009/02488; H03H 2009/02519; H03H 2009/02527; H03H 3/0072; H03H 3/0073; H03H 3/0077; H03H 9/02228; H03H 9/02393; H03H 9/02409; H03H 9/02433; H03H 9/02448; H03H 9/2473; H03H 9/0095; H03H 9/02102; H03B 5/30; H03B 1/04; H03B 21/01; H03B 21/02; H03B 25/00; H03B 5/32; H03B 5/04; H03B 5/326; B81B 3/0018; B81B 2201/0271; B81B 3/0086; H01L 2224/11; H01L 2224/48091; H01L 41/053; H01L 27/1203; H02N 1/006; H03L 1/00; H03L 1/04; H03L 7/16; H03L 1/02; H03L 7/00; H03L 7/06; H03L 7/18

See application file for complete search history.

(56) References Cited

U.S. PATENT DOCUMENTS

| | | | |
|---|---|---|---|
| 2003/0102510 A1* | 6/2003 | Lim | B82Y 15/00 257/368 |
| 2010/0207528 A1* | 8/2010 | Choi | H01J 37/32192 315/111.21 |
| 2015/0037249 A1* | 2/2015 | Fu | A61K 9/0009 424/1.11 |
| 2016/0002707 A1* | 1/2016 | Holm-Kennedy | B82Y 10/00 435/6.12 |

\* cited by examiner

*Primary Examiner* — Robert G Bachner
(74) *Attorney, Agent, or Firm* — Wolf, Greenfield & Sacks, P.C.

(57) ABSTRACT

Semiconductor-based sensor devices and methods for detection of biological agents are described herein.

18 Claims, 4 Drawing Sheets

SEMICONDUCTOR-BASED BIOSENSOR AND DETECTION METHODS

RELATED APPLICATIONS

This application claims priority to U.S. Provisional Application No. 62/594,721, filed Dec. 5, 2017, which is incorporated herein by reference in its entirety.

FIELD OF INVENTION

Semiconductor-based sensor devices and methods for detection of biological agents are described herein.

BACKGROUND

Biosensors generally comprise devices integrated with a binding molecule (also referred to herein as a "detector molecule") and a signal transducer, which can provide a recognition signal of the presence of a specific target (e.g., an analyte). Biosensors can be based on any number of physical principles, but generally depend on binding of a binding molecule to a target analyte. The specific binding or reaction between the binding molecule and the analyte can introduce a signal that is then transduced and measured. Biosensors can be configured for macromolecular recognition, such as with human cells of different types, viruses, and pathogenic organisms. Therefore, there is a far-reaching diagnostic utility in these devices ranging from applications towards human health, food safety, drug response, and personalized medicine.

SUMMARY

Semiconductor-based sensor devices and methods for detection of biological agents are described herein.

In one aspect, a device is provided. The device comprises a semiconductor sensor functionalized with a detector molecule. The device further comprises a heater integrated with the semiconductor sensor and a temperature measuring device integrated with semiconductor sensor. The heater is configured to heat the semiconductor sensor based at least in part on a temperature measured by the temperature measuring device.

In one aspect, a method is provided. The method comprises measuring the temperature of a portion of a device and/or a fluid in contact with the device. The device comprises a semiconductor sensor functionalized with a detector molecule. The method further comprises heating the semiconductor sensor and/or the fluid. The amount of heat applied to the semiconductor sensor and/or the fluid is based at least in part on the temperature measured in the measuring step.

In some embodiments, the semiconductor sensor comprises a substrate (e.g., comprising silicon).

The heater may comprise a metal wire on the substrate.

In some embodiments, the temperature measuring device is a microthermometer.

In some embodiments, the semiconductor sensor comprises a field effect transistor. The semiconductor sensor may comprise one or more nanowires.

In some embodiments, the detector molecule is capable of binding an analyte. The detector molecule, for example, may comprise an antibody, a DNA fragment, and/or RNA fragment. The detector molecule can comprise an enzyme. The detector molecule may comprise glucose oxidase. The analyte may comprises a biomolecule.

In some embodiments, the step of measuring the temperature comprises measuring an electrical property of a temperature measuring device integrated with the semiconductor sensor. The electrical property of the temperature measuring device is selected from the group comprising resistance, voltage, current, and conductance.

In some embodiments, the step of heating the semiconductor sensor and/or the fluid comprises applying current or voltage to a heater integrated with the semiconductor sensor. The amount of heat applied to the semiconductor sensor and/or fluid during the heating step is zero if the temperature measured during the step of measuring the temperature is below a predetermined target temperature.

In some embodiments, the method further comprises a step of exposing the semiconductor sensor to a fluid comprising an analyte.

The heating step may be performed such that the temperature measured by the temperature measuring device is within a target temperature range. For example, the target temperature range is greater than or equal to 0° C. and less than or equal to 50° C.; and, in some cases, the target temperature range is greater than or equal to 30° C. and less than or equal to 50° C. The heating step may enhances the binding of the analyte to the detector molecule relative to the binding in the absence of the heating step.

Other aspects and embodiments will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Semiconductor-based sensor devices and methods for detection of biological agents (e.g., analytes) are described herein. The devices may be used to detect analytes in a fluid in contact with the device. The analytes may bind to detector molecules which are functionalized on a surface of the sensor. Such binding can lead to a signal that may be measured to detect the presence of the analyte. As described further below, certain embodiments involve controlling the temperature of the fluid and/or the sensor device to affect the binding of the analytes to the detector molecules. For example, the sensor may be integrated with a heater and a temperature measuring device (e.g., a temperature sensor such as a thermometer) to control the temperature to a point above room temperature at the binding sites to enhance binding and, thus, improve detection. Controlling the temperature advantageously may also enable better control of the Debye length (e.g., an increase in temperature increases the Debye length, which can increase the signal measured by the sensor and improve detection). The sensors may be used to detect the presence of a specific molecule which may be useful for food safety, drug response, personalized medicine, cancer detection, disease verification, and other medical and biological applications.

Figure 1A:
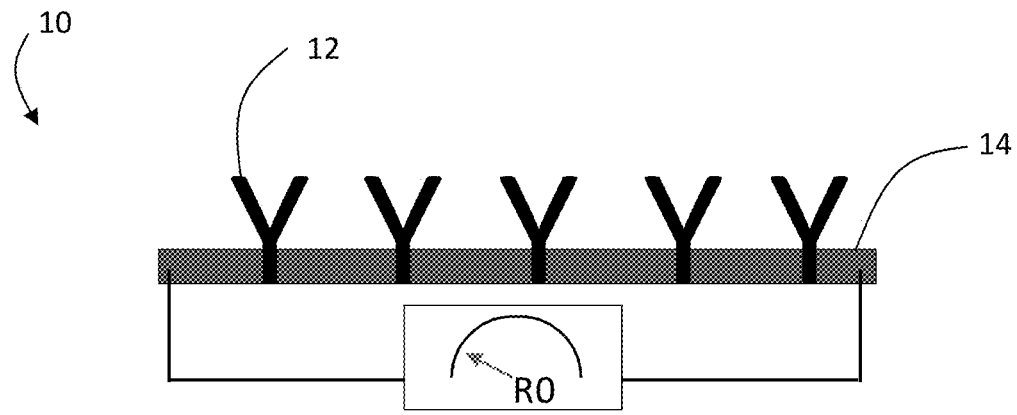
FIGS. 1A-1B shows schematic illustrations of an exemplary semiconductor sensor in the absence (FIG. 1A) and presence (FIG. 1B) of binding of an analyte to a detector molecule, according to certain embodiments.
Figure 1B:
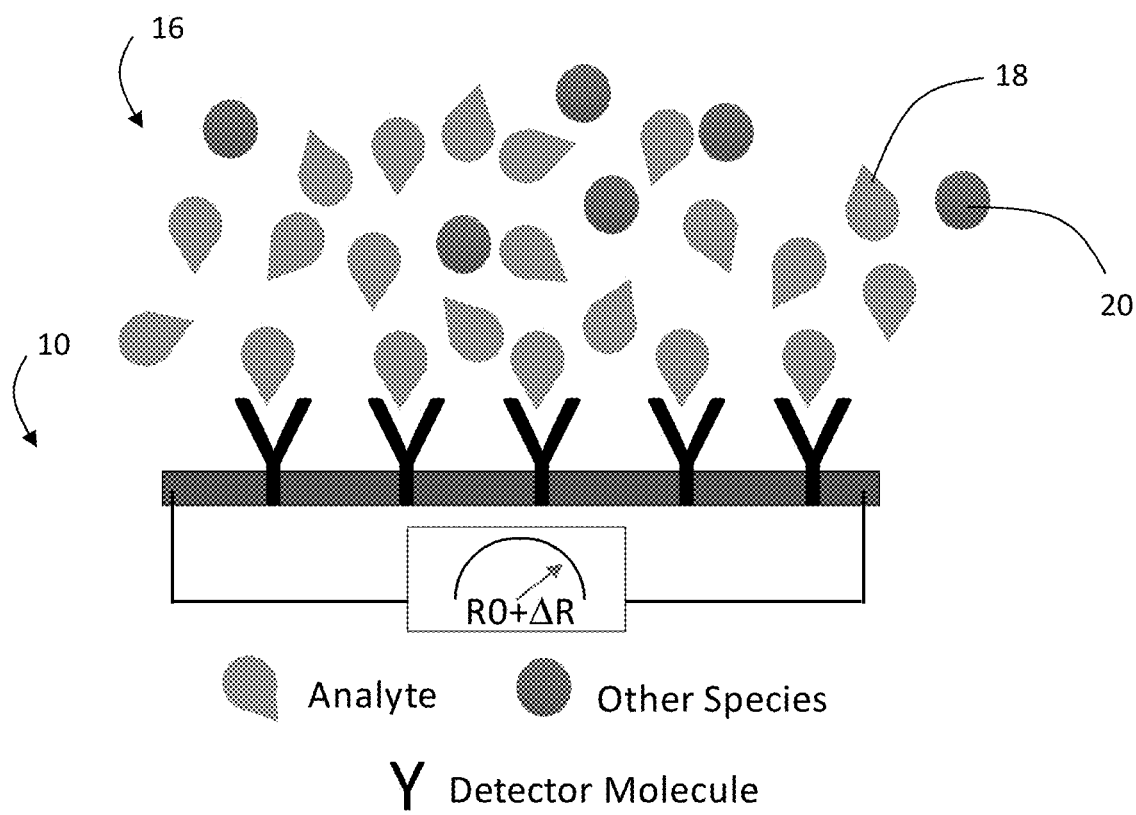

FIGS. 1A-1B show a semiconductor-based sensor 10 according to certain embodiments. Detector molecules 12 are functionalized on a surface 14 of the sensor. As described further below, the detector molecules are selected for their ability to bind to an analyte that is desired to be detected. FIG. 1B shows a fluid 16 in contact with the sensor. As shown, the fluid includes analytes 18 and other species 20. In this embodiment, the analytes bind to the detector molecules. The binding of the analyte causes a measurable change in physical properties (e.g., electrical properties) of the semiconductor. For example, in the illustrative embodiment, a measured resistance change $\Delta R$ indicates the presence of the analyte, as illustrated in FIGS. 1A and 1B. In this manner, the sensor can be used to detect a certain analyte concentration in a fluid sample It should be understood that a change in physical properties different than resistance may be measured. For example, the change in conductance (or $\Delta G$) may be measured in some embodiments; and, the change in conductivity may be measured in some embodiments. In some embodiments, structural changes in the detector molecule upon binding cause the measurable changes. In certain embodiments, the change is due to electrical gating by the analyte. In some embodiments, the change is due to a change in the surface plasmon resonance. In some embodiments, the change in property (e.g., conductance, resistance) may be generally detected electrically by applying an electric current to the sensor and measuring a change in voltage. In some embodiments, the change in property (e.g., conductance, resistance) may be generally detected electrically by applying an alternating electric field.

Any suitable semiconductor-based sensor device may be used. For example, suitable devices have been described in commonly-owned U.S. patent application Ser. No. 14/510,178, filed Oct. 9, 2014 and commonly-owned International Application No. PCT/US2015/041527 which published as International Publication Number WO 2016/089453, all of which are incorporated herein by reference in their entireties.

The sensor comprises a semiconductor material. Suitable semiconductor materials from which a nanosensor can be made include, but are not limited to, silicon, germanium, III-V semiconductors, and the like. In some embodiments, the sensor comprises silicon. The sensor may include one or more layers formed on, or beneath, the semiconductor material such as additional semiconductor material layers or insulating layers (e.g., oxides such as silicon oxide).

In some embodiments, the semiconductor is patterned into nanowire(s). The sensor may be, in some embodiments, a field-effect transistor sensor (e.g., nanosensor). Generally, field effect transistors (FETs) use an electric field to control the electrical channel of conduction, and hence the conductivity of the charge carriers in the channel. The flow of charge carriers between the source and the drain can be tuned by modifying the size and the shape of the conducting channel by applying an electric field to the gate. In an exemplary biosensor configuration, the FET comprises a nanosensor (e.g., nanowire) channel between source and drain terminals. The nanosensor (e.g., nanowire) surface can be bio-functionalized so that a biomolecular binding event can create an electric field, similar to the control electric field applied to a conventional FET (FIG. 1). In certain devices that use the FET principle, a designated, physically separated sensor surface can be formed by precision manufacturing. The FET sensor can be connected to an electronic circuit to monitor the specific conductance of the sensor surface. In some embodiments, operationally, many independent electronic circuits may be interrogated in a massively parallel manner. FET biosensors can be adapted for the measurement of biomolecules interacting with such a sensor surface (FIGS. 1A and 1B).

In some embodiments, the sensor comprises a nanoscale silicon-based FET device. Many such devices show sensitivity, reliability, robustness and the sensor flexibility needed for many multiplexed diagnostics microarrays. In some cases, the nanoscale devices can be developed and/or implemented on traditional top-down silicon. In some cases, by developing and implementing the nanoscale devices on traditional top-down silicon, the reliability and robust quality of top-down silicon semiconductor manufacturing processes can be improved and error rates in testing, both in point-of-care and central reference labs can be reduced. This can, in some cases, result in increased effectiveness of each patient visit to a lab or clinic, reduced cost of diagnosis, and earlier diagnosis, treatment, and monitoring.

In one particular embodiments, the nanosensor is a silicon nanochannel field effect transistor (FET) biosensor. Such sensors can be used to perform highly sensitive and/or label-free analyte detection. Such sensors can have exceptional electrical properties and small dimensions. In certain embodiments, the silicon nanochannels are ideally suited for extraordinarily high sensitivity. In some cases, the high surface-to-volume ratios of these systems make single molecule detection possible. In some cases, such FET sensors (e.g., biosensors) offer the benefits of high speed, low cost, and high yield manufacturing, without sacrificing the sensitivity typical for traditional optical methods in diagnostics. Top down manufacturing methods can be used to leverage advantages in Complementary Metal Oxide Semiconductor (CMOS) technologies, allowing for richly multiplexed sensor arrays. Examples of nanochannel based sensor systems are described, for example, in International Patent Publication WO 2008/063901A1 by Yu Chen et al., and International Patent Publication WO 2009/124111A1 to Mohanty et al., each of which is incorporated by reference in its entirety for all purposes.

In some embodiments, the semiconductor-based sensor can be part of a bias and measurement circuit. In some embodiments, the bias and measurement circuit is operated by applying a bias voltage across two ends of the nanosensor (e.g., nanochannels) within the circuit. The bias voltage can be selected to be sufficiently negative to achieve a desired dependence of the differential conductance of the sensing element on the surface potential of the sensor (e.g., of the nanochannels). In certain embodiments, this dependence has a steeply sloped region of high amplification which is substantially greater than a reference amplification exhibited by the sensing element at a zero-bias condition, thus achieving relatively high signal-to-noise ratio. The bias and measurement circuit measures, in some embodiments, the differential conductance of the sensing element and converts the measured differential conductance into a signal indicative of presence or activity of the analyte. In certain embodiments, the measured differential conductance can be converted into a signal indicative of the presence or activity of the analyte by using a look-up table or alternative conversion mechanism reflecting a prior calibration operation. In some embodiments, applied gate voltage can be used to control a sensor's sensitivity. The bias and reference gate voltage can be used independently, according to certain embodiments, to control sensitivity.

As described above, at least a portion of the sensor (e.g., a surface) is functionalized with a detector molecule. The detector molecule may comprise, for example, an antibody, enzyme, protein, peptide, small molecule, nucleic acid, aptamer, receptor molecule, polymer, and/or a supramolecular structure. The detector molecules may be designed to be particle-specific, i.e. only one specific analyte will bind to a given detector molecule. In some embodiments, the detector molecule is an antibody. In certain embodiments, the detector molecule is or comprises a DNA or RNA fragment. In some embodiments, the detector molecule is or comprises glucose oxidase. In some cases, the detector molecule is or comprises urease.

The analyte may comprise, for example, a protein, a small molecule, a nucleic acid, a peptide, an antibody, an aptamer, a biomarker, a gene, a virus particle, a supramolecular structure, a macromolecule, a receptor molecule, a biological cell, and/or a biological cell cluster. In some cases, the analyte comprises a biomolecule. In some instances, the analyte may be a protein biomarker or a gene biomarker. In certain embodiments, the analyte is or comprises a monosaccharide and/or a polysaccharide. For example, in some cases, the analyte is or comprises glucose. One non-limiting example of a small molecule analyte is urea.

It should be understood that the methods described herein are not limited to any particular detector molecule or analyte.

In some embodiments, the analyte and the detector molecule may associate via a chemical interaction, such as a chemical bond. The chemical bond may be a covalent bond or non-covalent bond. In some cases, the chemical bond is a non-covalent bond such as a hydrogen bond, ionic bond, dative bond, and/or a Van der Waals interaction. One or more of the species and/or agents (e.g., analyte, detector molecules) may comprise functional groups capable of forming such bonds. It should be understood that covalent and non-covalent bonds between components may be formed by any type of reactions, as known to those of ordinary skill in the art, using the appropriate functional groups to undergo such reactions. Chemical interactions suitable for use with various embodiments described herein can be selected readily by those of ordinary skill in the art, based upon the description herein.

In some embodiments, an association between the analyte and the detector species may occur via a biological binding event (i.e., between complementary pairs of biological molecules). For example, the analyte or the detector molecule may include an entity such as biotin that specifically binds to a complementary entity, such as avidin or streptavidin, on another species or agent. Other examples of biological molecules that may form biological bonds between pairs of biological molecules include, but are not limited to, proteins, nucleic acids, glycoproteins, carbohydrates, hormones, and the like. Non-limiting examples include, but are not limited to, an antibody/peptide pair, an antibody/antigen pair, an enzyme/substrate pair, an enzyme/inhibitor pair, an enzyme/cofactor pair, a protein/substrate pair, a nucleic acid/nucleic acid pair, a protein/nucleic acid pair, a peptide/peptide pair, a protein/protein pair, a small molecule/protein pair, a receptor/hormone pair, a receptor/effector pair, a ligand/cellular receptor pair, a biotin/avidin pair, a biotin/streptavidin pair, a drug/target pair, small molecule/peptide pair, a small molecule/protein pair, and a small molecule/enzyme pair. Biological interactions between species and/or agent(s) for use in the embodiments described herein can be selected readily, by those of ordinary skill in the art, based upon the description herein as their function, examples of such biological interactions, and knowledge herein and in the art as to simple techniques for identifying suitable biological interactions.

In certain embodiments, the analyte and the detector species may be associated with each other via a physical interaction. For example, in some embodiments, analyte (e.g., supramolecular structure) may be physically entangled with at least a portion of the detector species (e.g., macromolecule).

In certain embodiments, the analyte and the detector species may be associated with each other via a linking moiety (e.g., other biological or chemical species that causes the analyte and the detector species to be in close proximity. For example, the shortest distance between the analyte and the detector species associated with each other may be greater than a Debye length. In some instances, the shortest distance may be less than or equal to about 100 nanometers, less than or equal to about 50 nanometers, less than or equal to about 25 nanometers, less than or equal to about 10 nanometers, or less than or equal to about 1 nanometers.

As described above, certain embodiments involve controlling the temperature of the fluid and/or the sensor device to affect the binding of the analytes to the detector molecules. The temperature may be controlled by a heating step which enhances the binding of the analyte to the detector molecule relative to the binding in the absence of the heating step. For example, and without being bound by any particular theory, in some cases, when the fluid and/or sensor have a relatively low temperature, the analyte may bind relatively poorly to the detector molecule (e.g., due to the temperature dependence of the binding constant, or due to a temperature-dependent conformation of the analyte and/or the detector molecules). In some such cases, a heating step may increase the temperature of the fluid and/or sensor and thereby enhance the binding of the analyte to the detector molecule (e.g., by increasing the temperature-dependent binding constant, or by causing a conformational change in the analyte and/or detector molecule that results in conformations more conducive to binding).

Figure 2:
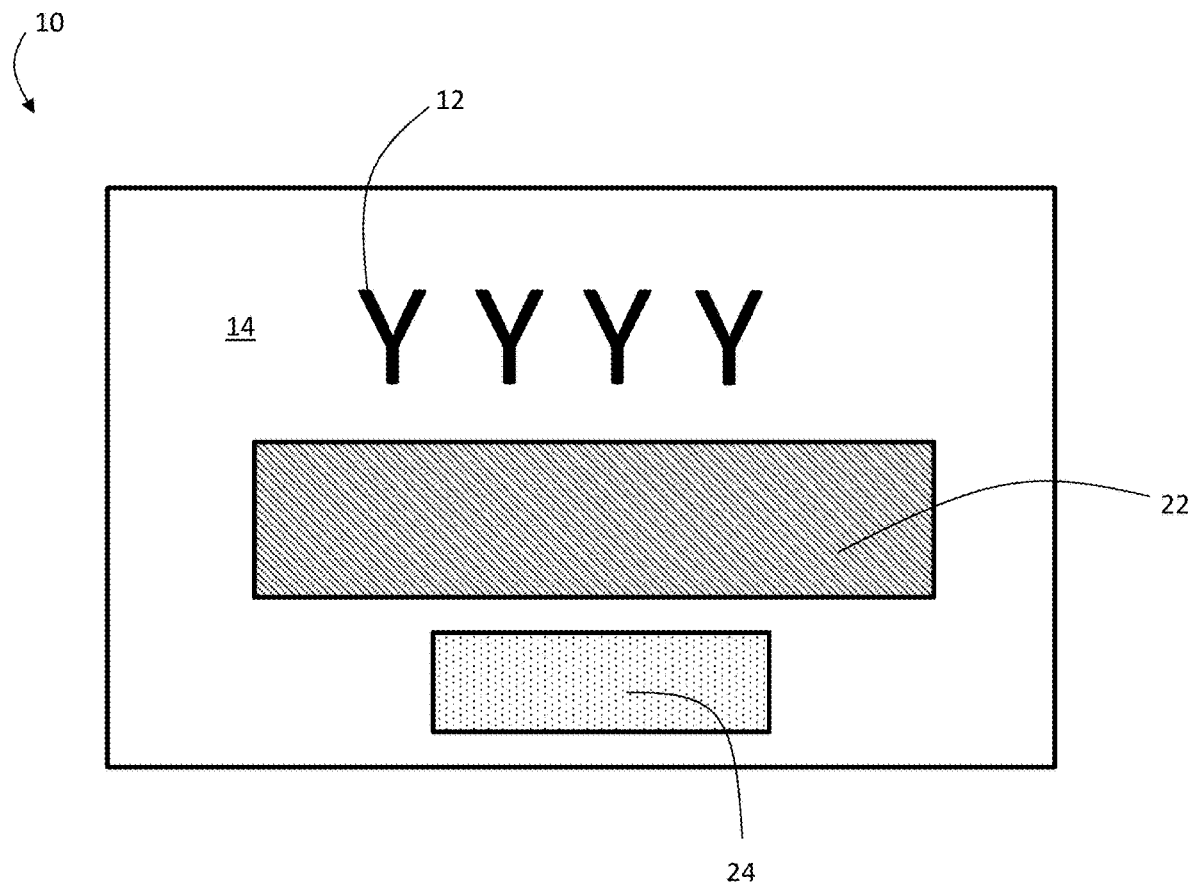
FIG. 2 shows a schematic illustration of a semiconductor sensor with an integrated heater and an integrated temperature measuring device, according to certain embodiments.

FIG. 2 shows a schematic illustration of a semiconductor-based sensor 10 with an integrated heater 22 and an integrated temperature measuring device 24, according to certain embodiments. The sensor also includes detector molecules 12, which are functionalized on surface 14 of the sensor as described above. As schematically shown, the heater and temperature measuring device are formed on the surface of the sensor proximate to the detector molecules so that the temperature at the binding sites may be controlled to be at a selected value and/or within a selected range, in accordance with certain embodiments.

Figure 3:
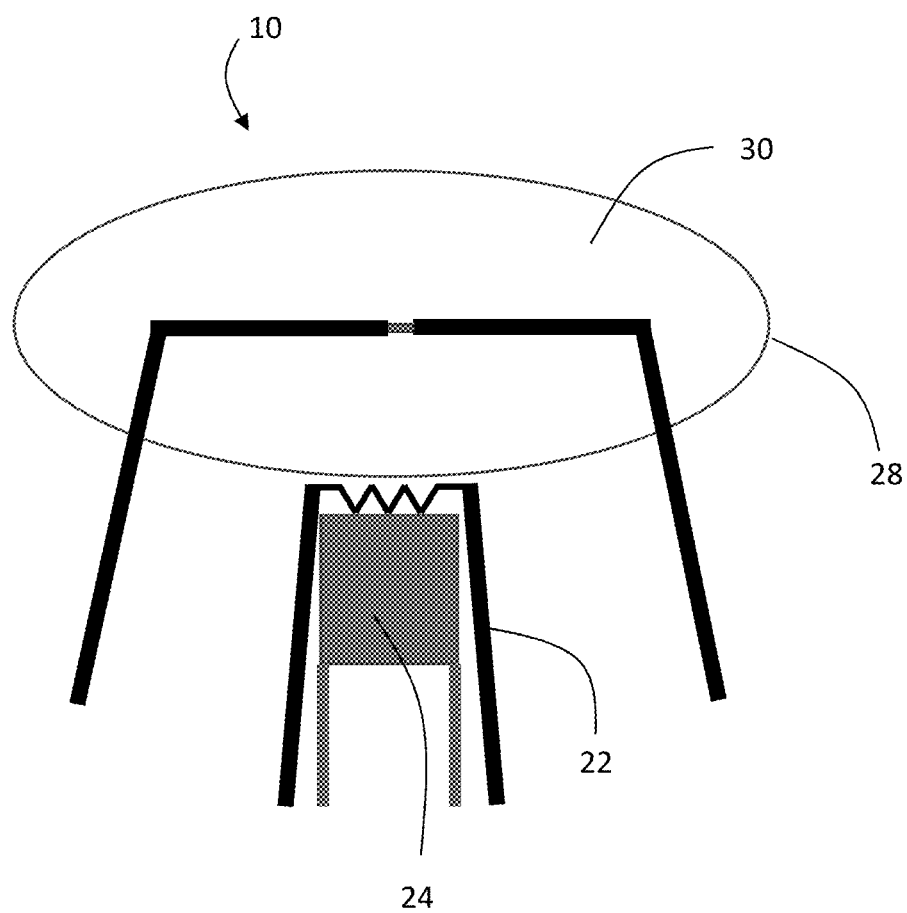
FIG. 3 shows a schematic illustration of a semiconductor sensor with an integrated heater and an integrated temperature sensor, according to certain embodiments, according to one non-limiting embodiment.

FIG. 3 shows another embodiment in which a sensing region 26 of the sensor is within a region 28 containing fluid sample 30. Region 28, for example, may be a microfluidic chamber. In this embodiment, heater 22 is placed near the edge of region 28 and the temperature measuring device placed at an opposite side of the heater. It should be understood that other arrangements of the heater and temperature measuring device may be used to provide suitable temperature control. For example, one or both of the heater and/or temperature measuring device may be placed inside region 28. In such embodiments, it may be important for care to be taken to prevent interference of the heater current with voltages applied to the sensor and/or fluid. Certain embodiments utilize multiple heaters and/or temperature measuring devices.

Heater 22 may be any suitable heating element that can be integrated with the sensor. In some embodiments, the heater comprises an elongated structure such as a wire (e.g., a metallic wire). For example, a meandering metal wire may be deposited on a substrate of different conductivity (e.g., insulating substrate). A current may be run through the wire which generates Joule heating that causes the substrate to increase in temperature. Temperature may be controlled by controlling the current flowing through the wire.

In some embodiments, the heater comprises a thermoelectric material which converts a voltage to heat. Temperature may be controlled by controlling the voltage across the thermoelectric material.

It should be understood that other suitable heaters may also be used.

Temperature measuring device 24 may be any suitable such device that can be integrated with the sensor. In some cases, the temperature measuring device is a microthermometer. In some embodiments, the temperature measuring device is a material whose resistivity depends on temperature, such as a thin-film metal or semiconductor. In such embodiments, the temperature is measured by measuring the resistance. In certain embodiments, the temperature measuring device is a thermoelectric material that produces a measured voltage in response to the temperature change.

It should be understood that other suitable heaters may also be used.

In general, any suitable method for controlling the heater using the temperature measuring device may be used. In some embodiments, output signals from the temperature measuring device may be used to control input signals to the heater. For example, some methods involve activating the heater by applying an electrical current to the heater (e.g., metal wire) and measuring the temperature using a thermometer (e.g., an integrated microthermometer). The current or voltage output that drives the heater may be adjusted using a feedback loop until the temperature stabilizes to a target temperature and/or range. In some cases, the temperature is controlled to a target temperature range that is greater than or equal to 0° C. and less than or equal to 50° C.; in some cases, the target temperature range is greater than or equal to 30° C. and less than or equal to 50° C. In some cases, the temperature is controlled to a precision within +/−5° C. and, in some cases, within +/−2° C.

The following is a non-limiting example that illustrates certain features of the sensors described herein.

Example

Figure 4:
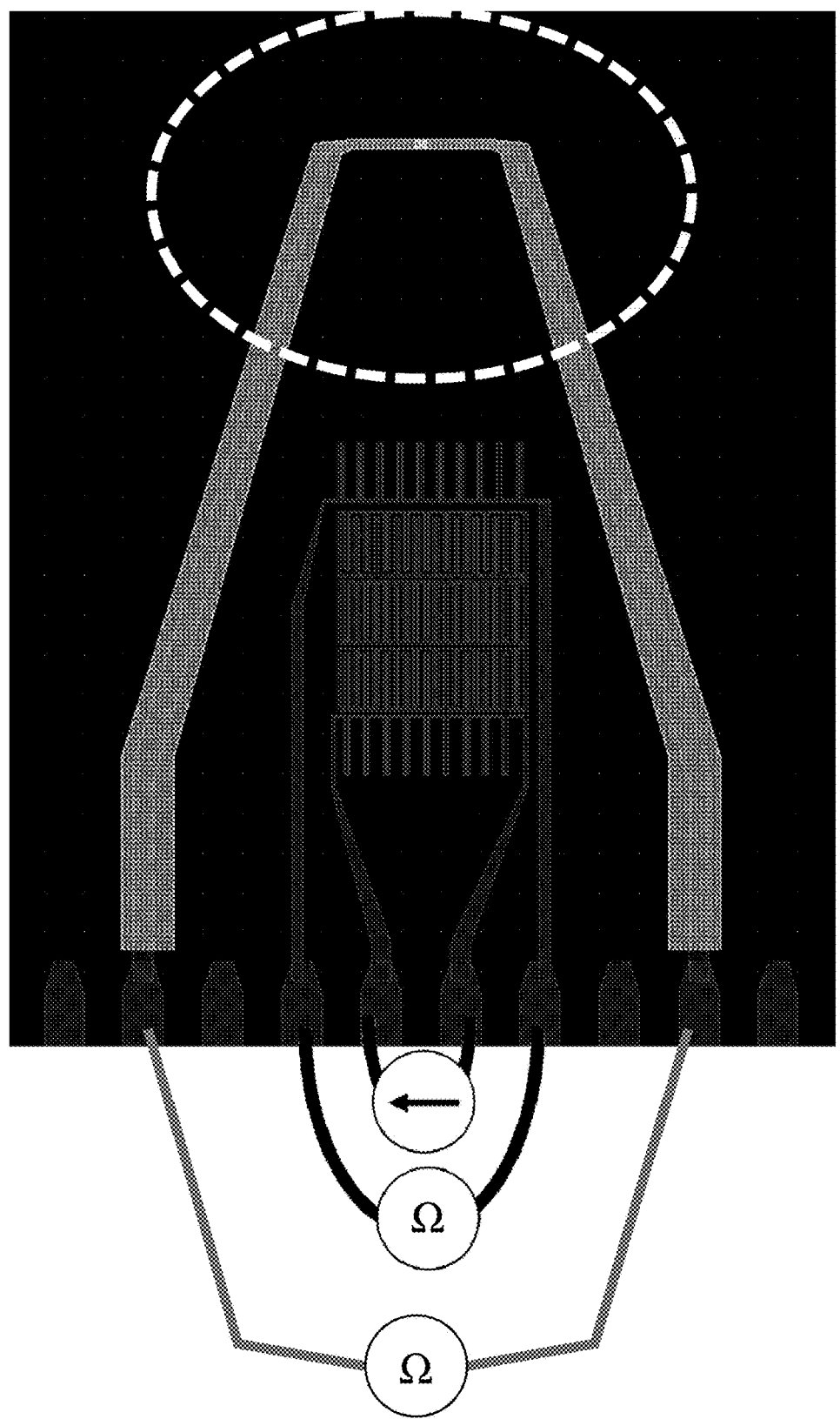
FIG. 4 depicts the a non-limiting design of a device comprising a semiconductor sensor with an integrated heater and an integrated temperature sensor, according to one non-limiting embodiment.

This example describes formation of a sensor including an integrated heater and temperature measuring device as shown in FIG. 4.

The sensor is made from a thin silicon layer, typically around 100 nm thick, which is on top of a silicon dioxide layer, typically 200 nm thick or greater.

Next, the nanowires and electrode attachment pads are created by electron beam lithography and reactive ion etching, which removes silicon everywhere except the sensor region. In some embodiments, this is split into two steps, whereby the nanowires and pads are defined separately. In some embodiments, the nanowires are defined with electron beam lithography and the pads with photolithography. In some embodiments, the pads and nanowires are all defined with photolithography.

Then the pattern for the metal electrodes in the 4-point measurement geometry is created with photolithography and the metal electrodes are deposited. The electrodes are a metal, such as Au, Cu, Ag, Al, and may be an alloy or metallic multilayer. In some cases, an adhesion layer of Ti, Ta, or another metal are used. The electrodes are approximately 10 to 20 microns wide near the sensor and become wider farther away. Typically, the metal thickness is in the range of 100 nm.

The electrodes are next coated with a thick insulating barrier, typically about 100 nm, typically an oxide such as $Al2O_3$, $SiO_2$, or $HfO_2$.

The nanowires and electrodes are then coated with a top thin insulating barrier, typically 10 nm, of a similar oxide.

Finally, metallic pads, shown in FIG. 4, are deposited to allow connection to external measurement and control equipment. The pads are typically 1 to 2 microns thick highly conductive noble metal, such as Au, Ag, Cu. In some embodiments, utilizing a metallic heater/thermometer system, the heater and thermometer are deposited at the same time as the pads, with connections shown in the figure. In other embodiments, the heater and thermometer are placed in a later step.

A schematic of the finished sensor, ready for integration into the final circuit, is shown in FIG. 4. This picture includes extra pads, which in some embodiments connect to reference electrodes and other control mechanisms. The fluid to be analyzed is placed in the oval region centered around the sensor.

What is claimed is:

1. A device, comprising:
   a semiconductor-based sensor comprising one or more wires functionalized with a detector molecule, wherein the detector molecule is capable of binding an analyte at a binding site;
   a heater integrated with the semiconductor-based sensor; and
   a temperature measuring device integrated with semiconductor-based sensor, wherein the heater is configured to heat the semiconductor-based sensor based at least in part on a temperature measured by the temperature measuring device to control temperature to a target temperature range above room temperature at binding sites to increase the binding of the analyte to the detector molecule.

2. The device of claim 1, wherein the semiconductor-based sensor comprises a substrate.

3. The device of claim 1, wherein the heater comprises a metal wire on the substrate.

4. The device of claim 1, wherein the temperature measuring device is a microthermometer.

5. The device of claim 1, wherein the semiconductor-based sensor comprises a field effect transistor.

6. The device of claim 1, wherein the detector molecule comprises an antibody, a DNA fragment, and/or RNA fragment.

7. The device of claim 1, wherein the detector molecule comprises an enzyme.

8. The device of claim 1, wherein the detector molecule comprises glucose oxidase.

9. The device of claim 1, wherein the detector molecule comprises urease.

10. The device of claim 1, wherein the analyte comprises a biomolecule.

11. The device of claim 1, wherein the analyte comprises a carbohydrate.

12. The device of claim 1, wherein the analyte comprises glucose.

13. The device of claim 1, wherein the analyte comprises urea.

14. A method, comprising:
providing a semiconductor-based sensor comprising one or more wires functionalized with a detector molecule, wherein the detector molecule is capable of binding an analyte at a binding site, wherein a heater and a temperature measuring device are integrated with the semiconductor-based sensor;
measuring the temperature of a portion of the sensor and/or a fluid in contact with the sensor; and
heating the semiconductor-based sensor and/or the fluid, wherein the amount of heat applied to the semiconductor-based sensor and/or the fluid is based at least in part on the temperature measured in the measuring step to control temperature to a target temperature range above room temperature at binding sites to increase the binding of the analyte to the detector molecule.

15. The method of claim 14, wherein the step of measuring the temperature comprises measuring an electrical property of a temperature measuring device integrated with the semiconductor-based sensor.

16. The method of claim 15, wherein the electrical property of the temperature measuring device is selected from the group comprising resistance, voltage, current, and conductance.

17. The method of claim 14, wherein the step of heating the semiconductor-based sensor and/or the fluid comprises applying current or voltage to a heater integrated with the semiconductor-based sensor.

18. The method of claim 14, comprising a step of exposing the semiconductor-based sensor to a fluid comprising an analyte.

* * * * *